United States Patent
Birzer et al.

(10) Patent No.: US 7,818,087 B2
(45) Date of Patent: Oct. 19, 2010

(54) METHOD AND CONTROL DEVICE FOR GUIDING THE MOVEMENT OF A MOVABLE MACHINE ELEMENT OF A MACHINE

(75) Inventors: Johannes Birzer, Rezelsdorf (DE); Jens Hamann, Fürth (DE); Raimund Kram, Erlangen (DE); Uwe Ladra, Erlangen (DE); Elmar Schäfers, Fürth (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 11/917,671

(22) PCT Filed: Jun. 2, 2006

(86) PCT No.: PCT/EP2006/062857

§ 371 (c)(1),
(2), (4) Date: Jul. 11, 2008

(87) PCT Pub. No.: WO2006/134036

PCT Pub. Date: Dec. 21, 2006

(65) Prior Publication Data

US 2009/0088891 A1 Apr. 2, 2009

(30) Foreign Application Priority Data

Jun. 14, 2005 (DE) .................. 10 2005 027 437

(51) Int. Cl.
*G06F 19/00* (2006.01)
(52) U.S. Cl. .................. 700/186; 700/28; 700/280

(58) Field of Classification Search .............. 700/28, 700/56, 61, 186, 189, 280; 318/560.569; 409/153

See application file for complete search history.

(56) References Cited

U.S. PATENT DOCUMENTS

| 6,452,355 | B2 * | 9/2002 | Forster et al. | 318/569 |
| 6,505,085 | B1 * | 1/2003 | Tuttle et al. | 700/28 |
| 6,580,245 | B2 * | 6/2003 | Quaschner et al. | 318/560 |

(Continued)

FOREIGN PATENT DOCUMENTS

DE 196 18 332 A1 1/1997

(Continued)

*Primary Examiner*—Charles R Kasenge
(74) *Attorney, Agent, or Firm*—Henry M. Feiereisen; Ursula B. Day

(57) ABSTRACT

A system for guiding movement of a movable machine element of a machine, such as a machine tool, production machine and robot, receives user input data relating to a travel movement of machine element and an optimization criterion selected from a robust travel movement, where a smallest number of natural frequencies of the movable machine element is excited, and a time-optimized travel movement, where from the natural frequencies of the movable machine element only those natural frequencies are excited that do not include a main natural frequency. The system then determines from the movement profile coefficients of polynomial functions and a position setpoint variable based on the coefficients. The travel movement of the machine element is executed in response to the determined position setpoint variable.

9 Claims, 2 Drawing Sheets

U.S. PATENT DOCUMENTS

| | | | |
|---|---|---|---|
| 6,694,196 B2 * | 2/2004 | Tuttle et al. | 700/28 |
| 6,782,306 B2 * | 8/2004 | Yutkowitz | 700/186 |
| 6,961,628 B2 * | 11/2005 | Yutkowitz | 700/37 |
| 2001/0056324 A1 | 12/2001 | Miyazawa | |
| 2002/0156541 A1 * | 10/2002 | Yutkowitz | 700/28 |
| 2003/0018400 A1 * | 1/2003 | Tuttle et al. | 700/29 |
| 2003/0033050 A1 * | 2/2003 | Yutkowitz | 700/189 |

FOREIGN PATENT DOCUMENTS

| | | |
|---|---|---|
| DE | 196 00 882 C1 | 9/1997 |
| DE | 198 00 552 A1 | 1/1999 |
| DE | 10118477 A1 | 12/2001 |
| DE | 100 55 169 A1 | 2/2002 |
| DE | 100 63 722 A1 | 7/2002 |
| DE | 100 65 422 A1 | 7/2002 |
| DE | 101 64 496 A1 | 7/2003 |
| DE | 10200680 A1 | 8/2003 |
| DE | 103 15 525 A1 | 10/2004 |
| DE | 103 21 970 A1 | 12/2004 |
| EP | 0 419 706 B1 | 1/1995 |

* cited by examiner

METHOD AND CONTROL DEVICE FOR GUIDING THE MOVEMENT OF A MOVABLE MACHINE ELEMENT OF A MACHINE

BACKGROUND OF THE INVENTION

The invention relates to a method for guiding the movement of a movable machine element of a machine, and to a corresponding control device.

Machines such as, for example, machine tools, production machines and/or robots frequently require a movable machine element to be positioned exactly, free from vibration and as quickly as possible. A movable machine element cannot be positioned free from vibration and optimally in terms of time by adjustment with the aid of a simple desired stipulation using a controller for moving the machine axes as a function of a prescribed travel path and prescribed dynamic parameters. Depending on the current load, the path length and the parameters set for jerk, acceleration and speed, when the machine element is being positioned more or less large vibrations of the machine element and/or of a load occur and can be avoided only with difficulty.

Vibrations of the load increasingly occur in the case of production machines in the form of loading and unloading devices, in particular.

The prior art discloses various optimization methods for guiding the movement of a movable machine element that enable appropriate movement profiles, for example time-optimized traveling, that is to say traveling of the machine element and/or the load at the highest possible speed and, in the process, keep the vibrations that occur in the machine element and/or the load in an acceptable range. However, such methods can be used to calculate virtually nonvibrating movement operations, the latter then being no longer time-optimized as a rule, that is to say the travel movement is carried out more slowly.

Such optimization methods are, however, sufficiently well known to the person skilled in the art from German laid open patent applications DE 100 63 722 A1, DE 102 00 680 A1 and DE 103 15 525 A1, which are intended to be valid as a constituent of the disclosure of this application. One or more natural frequencies of the machine axes to be moved can be suppressed with the aid of the above-described optimization methods. Generally speaking, the basic idea applies here, at least in principle, that the less the travel movement is to be implemented with vibrations, the less the movement can be carried out in a time-optimized fashion, that is to say less quickly, and vice versa.

All these optimization methods known from the prior art are not carried out commercially on a control device for controlling the machine, but they are carried out in advance by the user on a computing device outside the machine such as, for example, a personal computer. Commercially speaking, in this case the travel movement to be executed is input into the external computer (for example in order to move the machine element by 3 m in the X-direction) and the optimization method calculates a correspondingly optimized movement profile.

A movement profile calculated externally in such a way for each machine axis is then used to generate a setpoint variable in the control device for each machine axis of the machine, and to pass it on as desired value to a closed-loop controller for carrying out the travel operation of the movable machine element.

Here, the previously known mode of procedure has the disadvantage that, as already stated, there is firstly a need to calculate the movement profile on an external computer and then to transcribe the calculated movement profile onto the control device of the machine, which then executes the movement in accordance with the movement profile. The user, that is to say the operator of the machine, then no longer has any possibility when on the spot at the machine to influence the travel operation on the spot in a quasi-online fashion directly at the machine with regard to a movement operation, which still exhibits fewer vibrations, or with regard to a time-optimized movement operation, because the load is still vibrating too strongly in the case of the calculated movement profile, for example. To this end, it is firstly necessary commercially to recalculate on the external PC a new movement profile that then needs to be retranscribed onto the control device. Not until then can the movement guidance be carried out with the new movement profile. The previous mode of procedure is therefore very complicated and cost-intensive.

German laid open patent application DE 101 64 496 A1 discloses an automation system for movement guidance in which movement profiles are processed with reference to time and position for the purpose of guiding movement.

German laid open patent application DE 100 65 422 A1 discloses a method and an open-loop controller for compiling and optimizing cam functions.

German laid open patent application DE 100 55 169 A1 discloses a commercially available industrial open-loop controller for production machines, in particular.

SUMMARY OF THE INVENTION

The invention is based on the object of creating a simple method and a simple control device for the optimized guidance of the movement of a movable machine element of a machine, in the case of which the user can directly influence the optimization of the guidance of movement.

This object is achieved by means of a method for guiding the movement of a movable machine element of a machine having the following method steps that run on a control device for controlling the machine,
a) inputting a travel movement, to be carried out by the machine element, and an optimization criterion,
b) determining a movement profile with the aid of the travel movement, to be carried out by the machine element, and the optimization criterion,
c) determining a setpoint variable by means of the movement profile, and
d) outputting the setpoint variable to a closed-loop controller for carrying out the travel movement of the machine element.

Furthermore, this object is achieved by means of a control device for guiding the movement of a movable machine element of a machine, the control device having
means for inputting a travel movement to be carried out by the machine element and an optimization criterion,
means for determining a movement profile with the aid of the travel movement, to be carried out by the machine element, and the optimization criterion,
means for determining a setpoint variable by means of the movement profile and outputting the setpoint variable to a closed-loop controller for carrying out the travel movement of the machine element.

It proves in this case to be advantageous that a setpoint variable is determined by means of the movement profile by temporal sampling of the movement profile. This enables a particularly simple determination of the setpoint variable.

It proves, furthermore, to be advantageous that a setpoint variable is determined by means of the movement profile by ascertaining polynomial functions from the movement profile and using the coefficients of the polynomial functions to determine the setpoint variable. Determining the setpoint variable using coefficients of the polynomial function represents a commercial mode of procedure.

It proves, furthermore, to be advantageous that a movement profile is determined with the aid of the travel movement to be carried out by the machine element and the optimization criterion by selecting a suitable optimization method as a function of the optimization criterion and determining the movement profile with the aid of the selected optimization method. The determination of a movement profile that is particularly well optimized with regard to the particular application is enabled in that not just a single optimization method is used for optimizing the travel profile, but a suitable optimization method is selected as a function of the optimization criterion.

Machine tools, production machines and/or robots constitute conventional designs of machines in the case of which the problem of vibrating machine elements and/or loads occurs.

Furthermore, it proves to be advantageous that there is provided for a control device for carrying out the inventive method a computer program that includes code sections with the aid of which the method can be executed.

Advantageous designs of the method follow by analogy with the advantageous design of the control device, and vice versa.

BRIEF DESCRIPTION OF THE DRAWING

An exemplary embodiment of the invention is illustrated in the drawing and explained in more detail below. In the drawings.

DETAILED DESCRIPTION OF PREFERRED EMBODIMENTS

Figure 1:
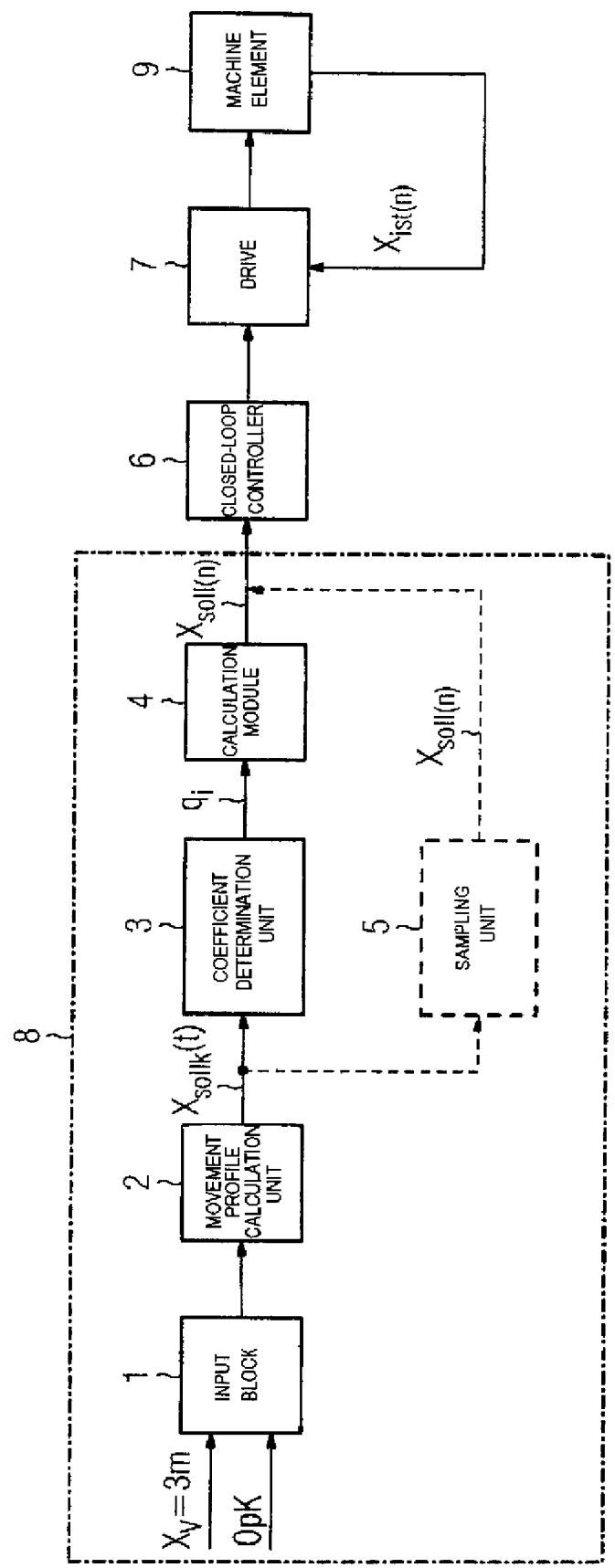
FIG. 1 shows an inventive control device.

FIG. 1 essentially illustrates an inventive control device 8. The control device 8 serves to control the machine, in particular a movable machine element 9 of the machine. To this end, the control device 8 determines a setpoint variable $X_{soll}(n)$ in the form of setpoint values, the setpoint variable $X_{soll}(n)$ being output to a closed-loop controller 6 as controlled input setpoint variable. The closed-loop controller 6 operates a drive 7 that serves to move the movable machine element 9. In this case, the control device 3 can serve, for example, to control a crane, and the machine element 9 can, for example, be provided in the form of a carriage that can be moved along the crane boom and, via a cable, carries the crane hook for suspending a load. The setpoint variable $X_{soll}(n)$ that describes the desired setpoint position of the carriage along the crane boom is provided to the closed-loop controller 6 as desired controlled variable. With the aid of a measuring system, a measured actual position variable $X_{ist}(n)$, that is to say the measured position of the machine element 9, is fed as actual variable to the closed-loop controller 6 in order to control the travel movement of the machine element 9. Of course, the closed-loop controller 6 can also be an integral component of the control device 8.

The movement guidance of the carriage 9 is now to be performed such that given a travel movement of the carriage by, for example, 3 m along the crane boom the load connected to the carriage 9 via a cable either vibrates extremely little or, for example, may vibrate more, but in turn the machine carriage, and thus the load, carries out as fast a travel movement as possible.

To this end, the control device 8 has a means for inputting a travel movement carried out by the machine element 9, and an optimization criterion OpK that is present in the form of an input block 1 in the exemplary embodiment. At the start of the method, the user performs inside the input block 1 an input of a travel movement $X_v$ to be carried out by the carriage 9, for example to move the carriage, and thus the load by 3 m along the crane boom. Furthermore, the user is requested to input an optimization criterion OpK with the aid of which the travel movement to be carried out is to be carried out. The input can in this case for example be performed inside an appropriate input mask on a display screen, the user being able to select the optimization criterion robustly or in a time-optimized fashion, for example.

As indicated by an arrow, the input data are fed to a means for determining a movement profile that is present in the exemplary embodiment in the form of a movement profile calculation unit 2. A movement profile $x_{sollk}(t)$ for the guidance of the movement of the movable machine element 9 with the aid of the travel movement to be carried out by the machine element 9 and the optimization criterion OpK is determined in the movement profile calculation unit 2. If the user has selected robustly in the input block 1, for example, an optimized movement profile is calculated in the movement profile calculation unit 2, for example by means of one of the optimization methods that are described in the laid open patent applications DE 103 15 525 A1, DE 102 00 680 A1 and DE 100 63 722 A1 and, since the user wishes there to be a robust guidance of movement, in this case the guidance of the movement of the machine element 9 is calculated such that as few vibrations as possible of the load suspended on the cable are excited or generated by the travel movement. To this end, the optimization method calculates a movement guidance that excites as few of the natural frequencies of the vibrating system (load, cable) as possible, in order thus to move the system with as little vibration as possible.

If the user has input inside the input block 1 that he wishes there to be time-optimized movement guidance, one of the optimization methods is used to calculate a movement profile in the case of which, for example, only the main natural vibration frequency is not excited by the travel movement, whereas the machine element moves at, for example, higher speeds and accelerations.

Of course, it is also possible here, as a function of the optimization criterion, firstly to select inside the movement profile calculation unit 2 one of the optimization methods that are optimum for the respective optimization criterion, and to determine the movement profile with the aid of the selected optimization method. For example, it is possible to use the optimization method in accordance with DE 100 63 722 A1 in order to suppress a single natural frequency in a preferably targeted fashion, and this is advantageous for a time-optimized movement guidance, while the method in accordance with laid open patent application DE 102 00 680 A1, for example, can be used to simultaneously suppress a number of natural frequencies, and this is advantageous for movement guidance with very few vibrations.

Figure 2:
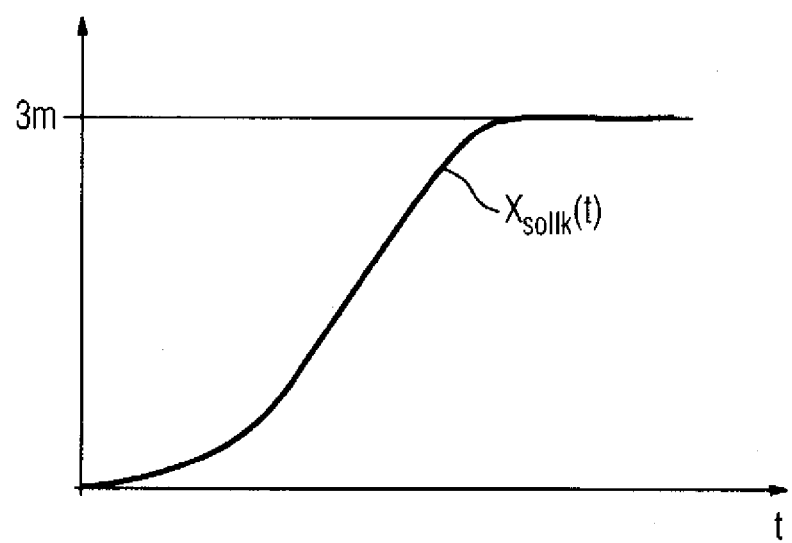
FIG. 2 shows a movement profile.

The movement profile calculation unit 2 outputs as output position a movement profile $X_{soll(t)}$ that is illustrated in FIG. 2.

The movement profile $X_{sollk}(t)$ specifies the continuous course of the setpoint variable as a function of the time t. The movement profile $X_{sollk}(t)$ is fed to a coefficient determination unit 3 which uses, for example, the methods disclosed in the German laid open patent applications DE 101 64 496 A1 and DE 100 65 422 A1, which are intended to be valid as a constituent of the disclosure of the present application, to determine a number of polynomial functions that describe the movement profile $X_{sollk}(t)$. To this end, the movement profile $X_{sollk}(t)$ is subdivided into movement sections, and the profile curves between the movement sections are respectively simulated by means of a polynomial function. The coefficient determination unit 3 outputs the coefficients $q_i$ of the individual polynomial functions as output variable to a calculation module 4. The setpoint variable $X_{soll}(n)$ is then determined in the calculation module 4 from the coefficients $q_i$, and output to the closed-loop controller 6 in order to carry out the travel movement of the machine element 9. The calculation of the setpoint variable $X_{soll}(n)$ from the coefficients $q_i$ can be performed, for example, in a very simple fashion in which firstly the time profile of the respective polynomial is calculated over the time t, and then the polynomial function is sampled equidistantly in an appropriate fashion.

The coefficient determination unit 3 and the calculation module 4 in this case constitute means for determining the setpoint variable by means of the movement profile and for outputting the setpoint variable to a closed-loop controller for carrying out the travel movement of the machine element.

As is illustrated in dashes in FIG. 1 it is possible, as an alternative, for the means for determining a setpoint variable also to be present in the form of a sampling unit 5. The latter samples the movement profile $X_{sollk}(t)$ in equidistant time intervals and thereby generates the setpoint variable $X_{soll}(n)$, which is composed of the equidistant sampled values.

Moreover, it may be remarked at this juncture that, for example, it is also possible alternatively or in addition to input in the input block 1 as optimization criterion the natural frequencies that are to be suppressed, and/or that, if appropriate, further parameters such as, for example, a maximum permissible jerk, a maximum permissible acceleration and/or a maximum permissible speed can alternatively or in addition be input as optimization criterion.

What is claimed is:

1. A method for guiding movement of a movable machine element of a machine, comprising the steps of:
    a) inputting a travel movement to be carried out by a machine element,
    b) selecting an optimization criterion from a robust travel movement, where a smallest number of natural frequencies of the movable machine element is excited, and a time-optimized travel movement, where from the natural frequencies of the movable machine element only those natural frequencies are excited that do not include a main natural frequency;
    c) determining a movement profile in response to the inputted travel movement and the selected optimization criterion;
    d) ascertaining polynomial functions from the movement profile and generating coefficients of the polynomial functions, and determining a position setpoint variable by means of the coefficients; and
    e) outputting the position setpoint variable to a closed-loop controller for executing the inputted travel movement of the machine element.

2. The method of claim 1, wherein the steps a) to e) are run on a control device for controlling the machine.

3. The method of claim 1, wherein step d) includes the step of temporally sampling the movement profile.

4. A control device for guiding movement of a movable machine element of a machine, comprising:
    first means for inputting a travel movement to be carried out by the machine element and for selecting an optimization criterion from a robust travel movement, where a smallest number of natural frequencies of the movable machine element is excited, and a time-optimized travel movement, where from the natural frequencies of the movable machine element only those natural frequencies are excited that do not include a main natural frequency;
    second means for determining a movement profile on the basis of the inputted travel movement and the selected optimization criterion;
    third means for ascertaining polynomial functions from the movement profile and generating coefficients of the polynomial functions, and a calculation module for determining the position setpoint variable on the basis of the coefficients; and
    fourth means for determining a position setpoint variable on the basis of the movement profile and for outputting the position setpoint variable to a closed-loop controller for executing the inputted travel movement of the machine element.

5. The control device of claim 4, wherein the machine is a member selected from the group consisting of machine tool, production machine and robot.

6. A system for guiding movement of a movable machine element of a machine, comprising:
    an input unit for allowing a user to input data relating to a travel movement to be carried out by a machine element and to input an optimization criterion selected from a robust travel movement, where a smallest number of natural frequencies of the movable machine element is excited, and a time-optimized travel movement, where from the natural frequencies of the movable machine element only those natural frequencies are excited that do not include a main natural frequency;
    a calculation unit responsive to the data for establishing a movement profile;
    a device for generating a position setpoint variable on the basis of the movement profile;
    a coefficient determination unit for ascertaining polynomial functions from the movement profile and generating coefficients of the polynomial functions, and a calculation module for determining the position setpoint variable on the basis of the coefficients; and
    a closed-loop controller for instructing a drive to execute the inputted travel movement of the machine element in response to the position setpoint variable.

7. The system of claim 6, wherein the machine is a member selected from the group consisting of machine tool, production machine and robot.

8. A system for guiding movement of a movable machine element of a machine, comprising:
    an input unit for allowing a user to input data relating to a travel movement to be carried out by a machine element and to input an optimization criterion selected from a robust travel movement, where a smallest number of natural frequencies of the movable machine element is excited, and a time-optimized travel movement, where from the natural frequencies of the movable machine element only those natural frequencies are excited that do not include a main natural frequency;
    a calculation unit responsive to the data for establishing a movement profile;
    a device including a sampling unit which samples the movement profile in equidistant time intervals to generate a position setpoint variable; and
    a closed-loop controller for instructing a drive to execute the inputted travel movement of the machine element in response to the position setpoint variable.

9. The system of claim 8, wherein the machine is a member selected from the group consisting of machine tool, production machine and robot.

* * * * *